United States Patent [19]

Seino et al.

[11] Patent Number: 4,730,884

[45] Date of Patent: Mar. 15, 1988

[54] BIPOLAR VOLTAGE CONTROLLED OPTICAL SWITCH USING INTERSECTING WAVEGUIDES

[75] Inventors: Minoru Seino, Atsugi; Hirochika Nakajima, Kawasaki; Ippei Sawaki, Sagamihara; Hidehiro Mishiro, Kawasaki, all of Japan

[73] Assignee: Fujitsu Limited, Kawasaki, Japan

[21] Appl. No.: 890,974

[22] Filed: Jul. 29, 1986

Related U.S. Application Data

[63] Continuation of Ser. No. 535,985, Sep. 26, 1983.

[30] Foreign Application Priority Data

| Sep. 30, 1982 | [JP] | Japan | 57-171218 |
| Nov. 19, 1982 | [JP] | Japan | 57-203067 |
| Dec. 28, 1982 | [JP] | Japan | 57-230096 |

[51] Int. Cl.⁴ ............................................. G02B 6/10
[52] U.S. Cl. .............................. 350/96.14; 350/96.12; 350/96.13
[58] Field of Search ............... 350/96.11, 96.12, 96.13, 350/96.14; 372/19

[56] References Cited

U.S. PATENT DOCUMENTS

| 3,395,366 | 7/1968 | Snitzer | 372/19 |
| 3,686,584 | 8/1972 | Wahl | 372/19 |
| 4,070,092 | 1/1978 | Burns | 350/96.14 |
| 4,127,320 | 11/1978 | Li | 350/96.13 |
| 4,130,342 | 12/1978 | McMahon | 350/96.12 |
| 4,196,964 | 4/1980 | Papuchon | 350/96.14 |
| 4,262,992 | 4/1981 | Berthold | 350/96.14 |
| 4,500,996 | 2/1985 | Sasnett et al. | 372/19 |
| 4,674,827 | 6/1987 | Izutsu et al. | 350/96.12 |

FOREIGN PATENT DOCUMENTS

56-41342  9/1982  Japan ........................ 350/96.13

OTHER PUBLICATIONS

Haruna et al., "Thermal-Optic Effect in Li Nb O₃...", Elect. Lett., 10/81, vol. 17, No. 22, pp. 842-844.
Ramaswamy et al., "Balanced Bridge Modulator . . . Waveguides", Appl. Phys. Lett., 5/78, pp. 644-645.
European Search Report, The Hague, Examiner: C. V. Heydendorff, 2/13/86.
Alferness, IEEE Transactions on Microwave Theory and Techniques, vol. MTT-30, No. 8, Aug. 1982, "Waveguide Electrooptic Modulators", pp. 1121-1137.
Papuchon et al., Applied Physics Letters, vol. 31, No. 4, Aug. 15, 1977, "Electrically Active Optical Bifurcation: BOA", pp. 266-267.

*Primary Examiner*—William L. Sikes
*Assistant Examiner*—Brian M. Healy
*Attorney, Agent, or Firm*—Staas & Halsey

[57] ABSTRACT

An optical switch comprising: an electrode-optic crystal substrate (1, 1'); a central waveguide (21); a pair of input waveguides (22, 23), and a pair of output waveguides (24, 25). A refractive-index-changed region (R') is provided symmetrically within some part of the central waveguide. Switching from the straight-through state to the branching state or vice versa is carried out by introducing a change in the refractive index of the index-changed region.

15 Claims, 22 Drawing Figures

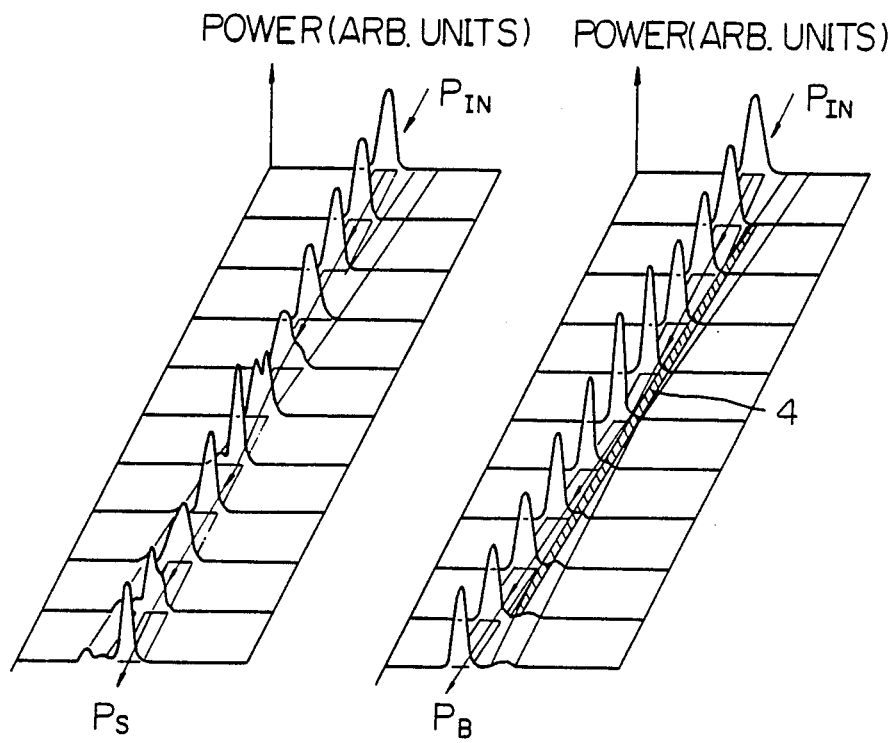
Fig. 3 PRIOR ART
Fig. 4 PRIOR ART
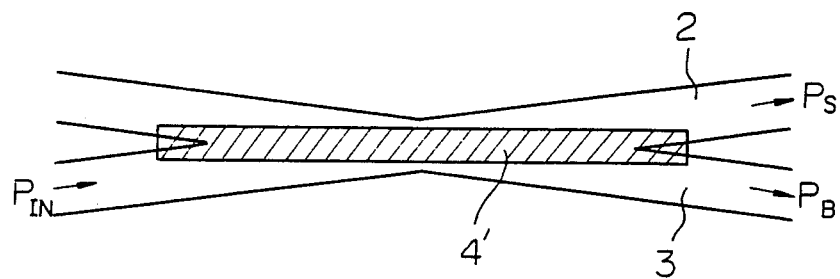
Fig. 6

BIPOLAR VOLTAGE CONTROLLED OPTICAL SWITCH USING INTERSECTING WAVEGUIDES

This is a continuation of co-pending application Ser. No. 535,985 filed on Sept. 26, 1983.

BACKGROUND OF THE INVENTION

1. Field of the Invention

The present invention relates to a bipolar voltage controlled optical switch for single-mode light using two intersecting waveguides.

2. Description of the Prior Art

An optical switch is a switching circuit which enables signals in optical waveguides to be selectively switched from one path to another by using electro-optic effects.

Known optical switches include total-internal-reflection (TIR)-type optical switches and directional-coupler-type optical switches. TIR-type optical switches are attractive because of their simple structure and mechanism, but have the disadvantage of poor crosstalk characteristics and a high operating voltage for single-mode light. Note that most of the TIR-type switches have been used for multi-mode light. In this case, although these switches have a relatively low operating voltage, the switches have high excitation dependency.

Directional-coupler-type optical switches usually have two separate waveguides. In these switches, asymmetric changes are electrically induced in the refractive indexes of the waveguides so as to switch signals in the waveguides from one path to another or vice versa. However, these switches are so complex in structure due to the presence of a gap between the waveguides that fabrication errors are often generated. For improving this, a $\Delta\beta$-reversal type directional-coupler switch has been proposed, however, it requires complex electrodes.

On the other hand, a directional-coupler-type optical switch with no gap between waveguides, i.e., with intersecting waveguides, has been proposed (See: M. Papuchon and Am. Roy, "Electrically Active Optical Bifurcation: BOA", Applied Physics Letters, Vol. 31, No. 4, Aug. 15, 1977). This optical switch comprises a central waveguide, a pair of input waveguides connected to an end of the central waveguide, and a pair of output waveguides connected to the other end of the central waveguide. In this switch, the entire central waveguide is a refractive-index-changed region. As will be explained later, such as BOA switch requires high refractive index change, so that a relatively high operating voltage is also required. As a result, the switching speed is decreased.

SUMMARY OF THE INVENTION

It is an object of the present invention to provide a bipolar-type optical switch for single-mode ligh using intersecting waveguides controlled by low bipolar drive voltages, thereby increasing the switching speed.

It is another object of the present invention to provide a bypolar-type optical switch which is simple in structure.

It is still another object of the present invention to provide a bypolar-type optical switch which is suitable for matrix switches.

According to the present invention, a refractive-index-changed waveguide region having a narrower width than a central waveguide is provided. The refractive-index-changed region is formed symmetrically with regard to the center of the central waveguide.

BRIEF DESCRIPTION OF THE DRAWINGS

The present invention will be more clearly understood from the description as set forth below with reference to the attached drawings.

FIGS. 3 and 4 illustrate the light wave propagation in the TIR-type optical switch of FIG. 2;

FIG. 6 is a plan view of a first embodiment of the bipolar-type optical switch according to the present invention;

DESCRIPTION OF THE PREFERRED EMBODIMENTS

Figure 1:
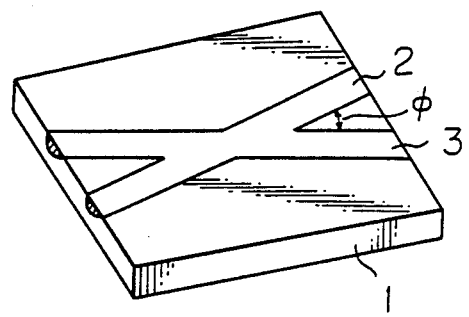
FIG. 1 is a perspective view of two intersecting optical waveguides.

In FIG. 1, which illustrates two intersecting optical waveguides, reference numeral 1 designates an electro-optic crystal substrate in which two waveguides 2 and 3 are formed. The waveguides 2 and 3 intersect each other at an angle of $\phi$.

The waveguide device illustrated in FIG. 1 is fabricated as follows: A titanium (Ti) thin pattern which is, for example, 7.5 $\mu$m wide and 390 Å thick is formed by conventional photolithographic technology on the crytal substrate 1, which is composed of LiNbO$_3$. Next, Ti is diffused into the substrate 1 at 1040° C. for 5 to 10 hours in an argon atmosphere. The waveguides 2 and 3 formed as a result have higher refractive indexes than the substrate 1.

Note that the intersecting waveguides 2 and 3 can be used for both TIR-type optical switches and bipolar-type optical switches.

In TIR-type switches, since low crosstalk characteristics between intersecting waveguides are indispensable, the intersecting angle $\phi$ must be considerably large. On the other hand, as will be explained later, bipolar-type switches have no limitation on the intersecting angle, and are rather effective in the case where the intersecting angle $\phi$ is relatively small.

Figure 2:
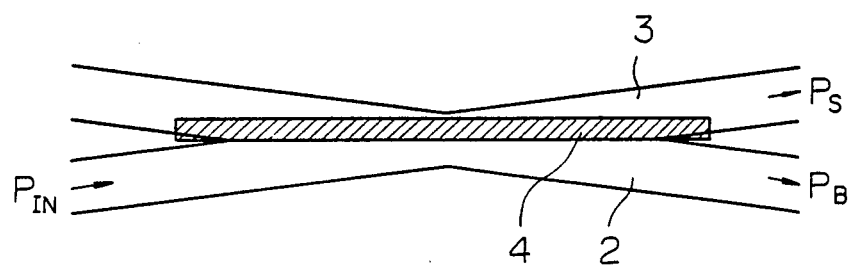
FIG. 2 is a plan view of a prior art TIR-type optical switch.

In FIG. 2, which illustrates a prior art TIR-type optical switch, a rectangular electrode 4 is provided on the top half of the intersecting portion of the waveguides 2 and 3. Reference letters $P_{IN}$ designate the input light power. Reference letters $P_S$ designate the power of light travelling straight-through the switch, and reference letters $P_B$ designate the power of light branching out of the switch.

The operating mechanism of the TIR-type optical switch of FIG. 2 will be explained with reference to FIGS. 3 and 4.

Referring to FIG. 3, when the switch is in a straight-through mode where no voltage is applied to the electrode 4, most of the light propagates straight through the switch. A slight amount of the light, however, leaks onto the branch side of the switch. In order to reduce the leakage (crosstalk) of light to the branch side, the branching angle between the waveguides 2 and 3 is set relatively large, for example, 2°.

Referring to FIG. 4, when the switch is in a branch mode where a high voltage, for example, $-150$ V is applied to the electrode 4, the refractive index of a region under the electrode 4 is reduced, so that light is reflected by the region. Therefore, light propagates to the branch side. Note that such a region is called a refractive-index-changed region.

Figure 5:
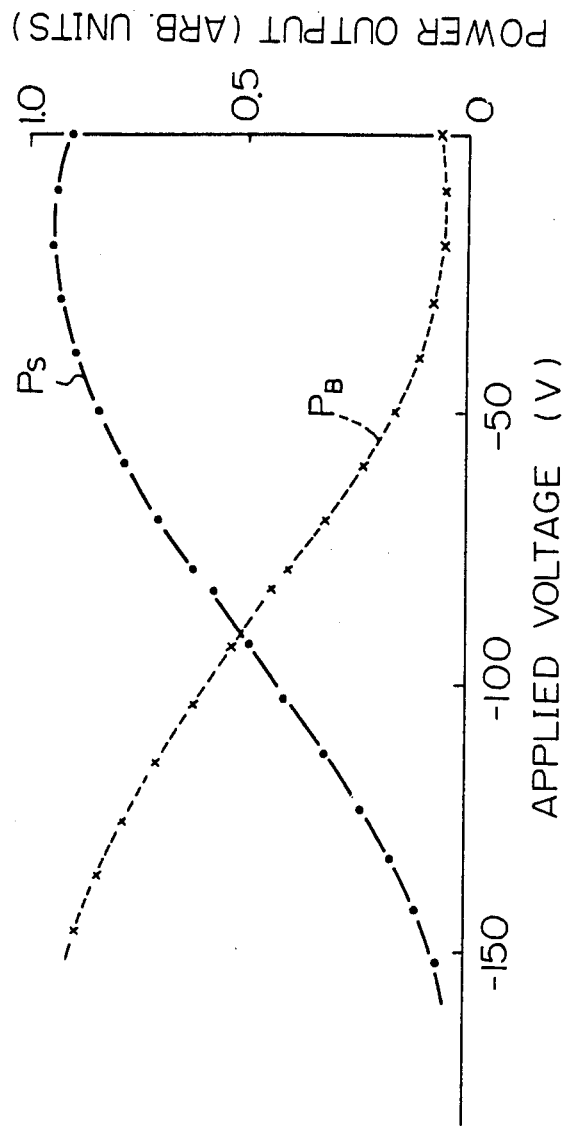
FIG. 5 illustrates the power output characteristics of the TIR-type optical switch of FIG. 2.

Referring to FIG. 5, which illustrates the power output characteristics of the TIR-type optical switch of FIG. 2, the straight-through output $P_S$ is maximum when no voltage is applied to the electrode 4, while the branch output $P_B$ is maximum when about $-150$ V is applied to the electrode 4. Such a high voltage required for a switching operation reduces the operation speed.

In addition, as is understood from FIG. 5, the crosstalk characteristics of the optical switch of FIG. 2 are poor.

Further, the optical switch of FIG. 2 serves as only a $1 \times 2$ type switch, i.e., a switch which has one input terminal and two output terminals. Therefore, to construct a $2 \times 2$ type switch by using the optical switch of FIG. 2, four optical switch elements are necessary, reducing the integration degree of optical circuits using the optical switch of FIG. 2.

Further, the width of the electrode 4, i.e., the width of the refractive-index-changed region, is made as large as possible in order to reflect completely light to the branch side.

In FIG. 6, which illustrates an embodiment of the bipolar-type optical switch according to the present invention, a rectangular electrode 4' is provided at the center of an intersecting portion of the single mode waveguides 2 and 3. Note that symmetric Al electrodes (not shown) 7 μm wide and 1800 Å thick separated by 7 μm are fabricated using a 1/10 projection aligner to obtain good alignment. The waveguides 2 and 3 are fabricated by diffusing a Ti layer 7.5 μm wide and 390 Å thick at 1035° C. for 5 hr into the substrate 1. In this optical switch, a positive or negative voltage is applied to the electrode 4' so as to change the refractive index of the refractive-index-changed region opposing the electrode 4'. In this case, note that the crystal substrate 1 (shown not in FIG. 6, but in FIG. 1) comprises a Z-cut LiNbO$_3$ crystal (or Z-plane) and the r$_{33}$ electro-optical coefficient is used.

In an off state, a negative voltage such as $-51$ V is applied to the electrode 4' so as to reduce the refractive index of the refractive-index-changed region ($-\Delta n$ effect). In an on state, a positive voltage such as 36 V is applied to the electrode 4' so as to increase the refrective index of the refractive-index-changed region ($+\Delta n$ effect). Based upon the $-\Delta n$ effect and the $+\Delta n$ effect, each of the operating voltages is low so that the operation speed is increased.

As illustrated in FIG. 6, the electrode 4' has a symmetrical structure at the center of the intersecting waveguides 2 and 3. Accordingly, the optical switch of FIG. 6 can serve as a $2 \times 2$ type switch which has two input terminals and two output terminals.

Note that the width of the electrode 4' is smaller than that of the intersecting portion of the waveguides 2 and 3, which will be later explained.

The operating mechanism of the optical switch of FIG. 6 will be explained with reference to FIGS. 7 and 8. In this case, the straight-through mode in which light propagates straight is due to the $-\Delta n$ effect, while the branch mode in which light is deflected to the branch side is due to the $+\Delta n$ effect.

Figure 7:
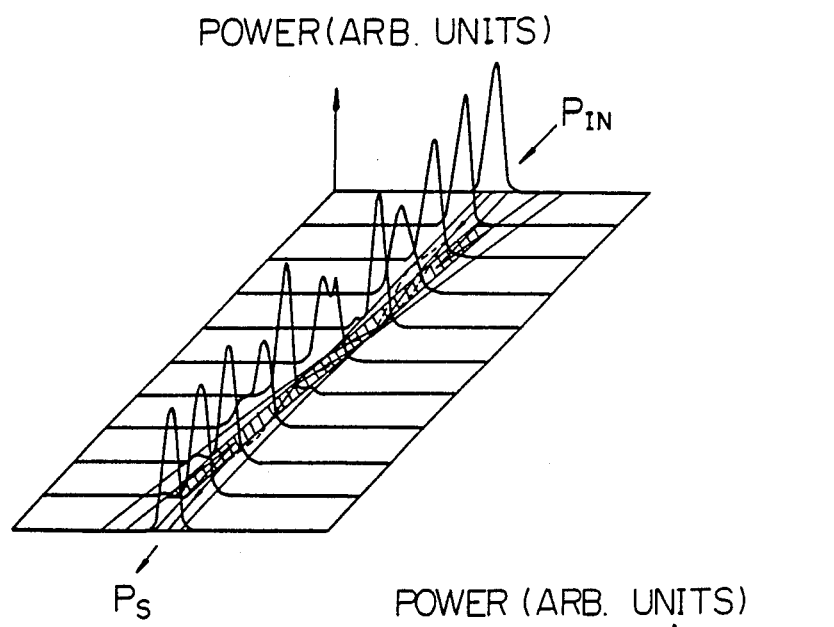
FIGS. 7 and 8 illustrate light wave propagation in the optical switch of FIG. 6.
Figure 8:
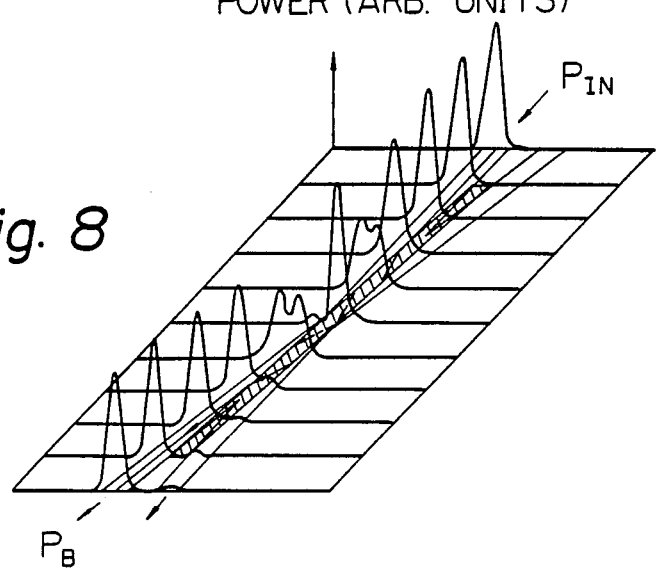

Referring to FIG. 7, in the case of a straight-through mode where a negative voltage such as $-51$ V is applied to the electrode 4', the refractive index change of the refractive-index-changed region $\Delta n$ is $-0.0015$. In this case, light is deflected twice and reaches the straight side. That is, the locus of light of FIG. 7 is different from that of FIG. 3. Referring to FIG. 8, in the case of a branch mode where a positive voltage such as 36 V is applied to the electrode 4', the refractive index change $\Delta n$ of the refractive-index-changed region is 0.001. In this case, light is deflected once and reaches the branch side. Note that operating voltages of a bipolar-type switch decreases when the intersecting angle decreases. For example, when the intersecting angle is 0.2°, the operating voltages are $\pm 12$ V.

Figure 9:
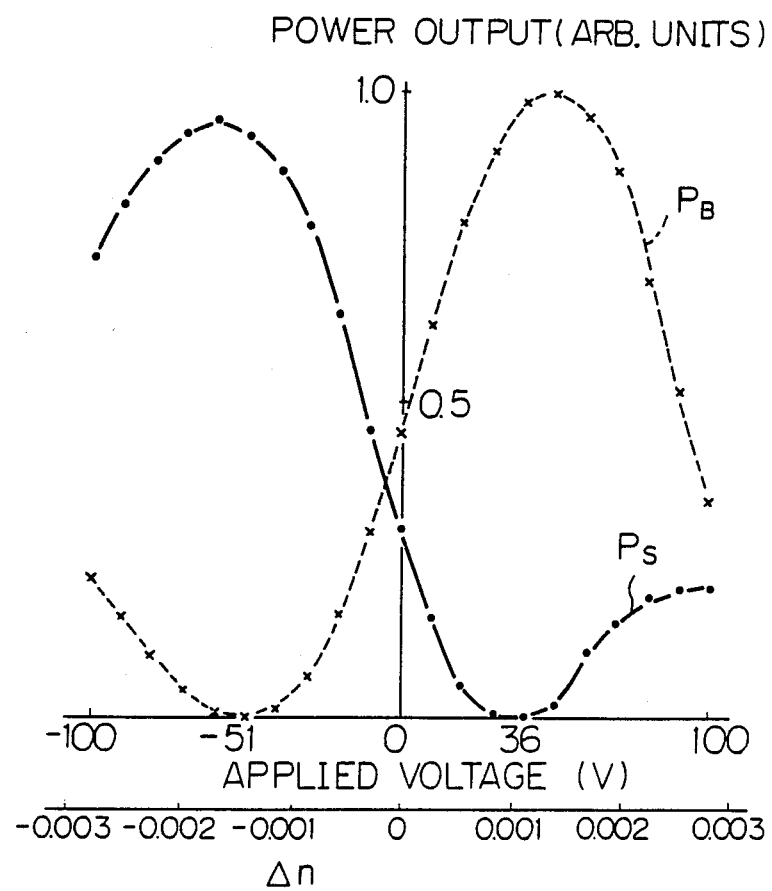
FIGS. 9 and 10 illustrate the power output characteristics of the optical switch of FIG. 6.
Figure 10:
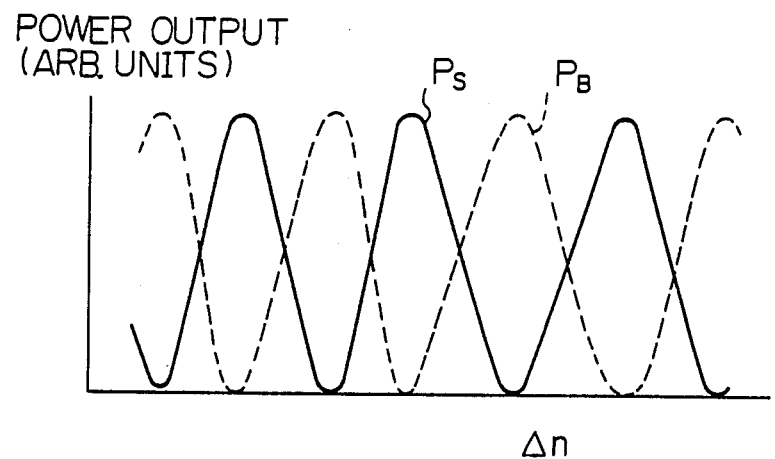

Thus, as shown in FIG. 9, switching is accomplished out by applying bipolar voltages opposite to each other to the electrode 4'. In addition, as shown in FIG. 10, the straight-through output $P_S$ and the branch output $P_B$ have a periodicity with regard to the refractive index change $\Delta n$ of the refractive-index-changed region. Such a periodicity is determined by the design conditions of the waveguides, such as the concentration of Ti and other diffused material, the width of the waveguides, the width of the electrode, and the branching angle between the waveguides. Therefore, a switching operation can be performed by applying two different voltages of the same polarity.

Figure 11:
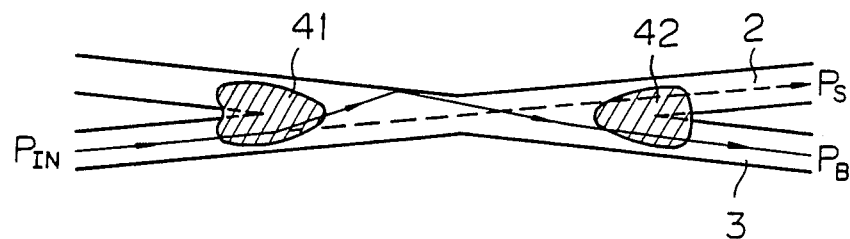
FIGS. 11 and 12 illustrate modifications of the optical switch of FIG. 6.
Figure 12:
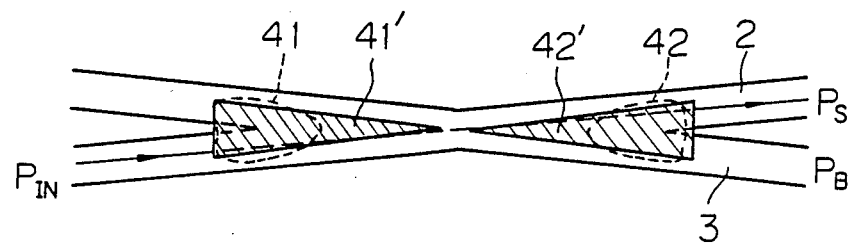

In FIG. 11, which is a modification of the optical switch of FIG. 6, two electrodes, i.e., two refractive-index-changed regions 41 and 42, are provided instead of the electrode 4' of FIG. 6. In this case, a similar effect to that of FIG. 6 is obtained. In FIG. 12, which is also a modification of the optical switch of FIG. 6, two refractive-index-changed regions 41' and 42' are provided. Each of the regions 41' and 42' has an isosceles triangle shape, which substantially covers the regions 41 and 42, respectively. In this case, a similar effect to that of FIG. 6 is also obtained.

Figure 13:
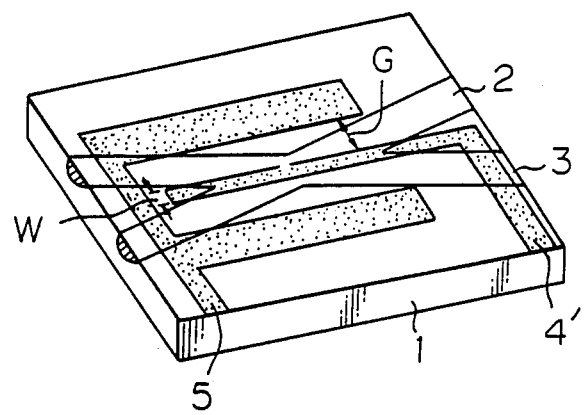
FIG. 13 is a perspective view of the optical switch of FIG. 6.

In FIG. 13, which is a perspective view of the optical switch of FIG. 6, a ground electrode 5 which is omitted from FIG. 6, is illustrated. In FIG. 13, the width of the waveguides is, for example, 7.5 μm, the branching angle is 1.7°, the width W of the electrode 4' is 4 μm, the gap G between the electrode 4' and the electrode 5 is 7 μm, and the difference in refractive index between the substrate 1 and the waveguides 2 an 3 in the case where no voltage is applied to the electrode 4' is 0.004.

The characteristics of this switch depend on the waveguide and electrode structures. Misalignment of the electrodes from the center of the interaction region increases crosstalk and requires higher drive voltage, so it is preferable to maintain alignment within 0.5 μm. The electrode width is also important. If it is too wide, the positive-index-changed region under the central electrode supports higher modes and crosstalk increases. The electrode width must be narrow enough to obtain good performance. Drive voltage also depends on the intersecting angle: the smaller the angle, the lower the drive voltage.

Figure 14:
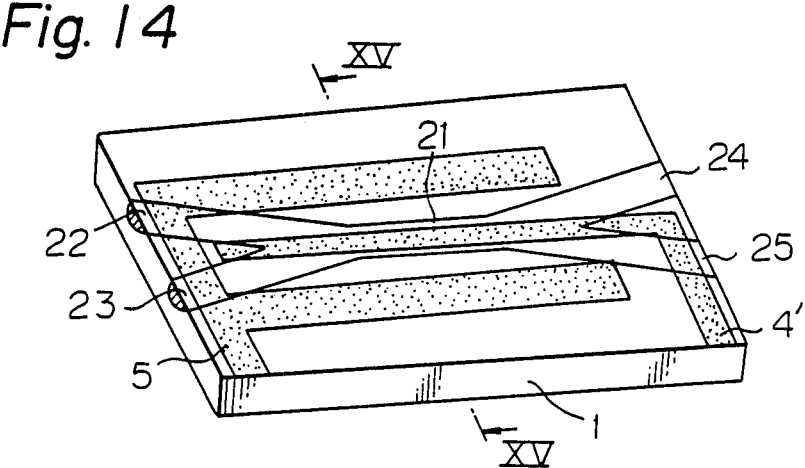
FIG. 14 is a perspective view of another embodiment of the optical switch according to the present invention.

In FIG. 14, which illustrates another embodiment of the optical switch according to the present invention, an intersection waveguide, i.e., a central waveguide 21, has a definite width. Input waveguides 22 and 23 are connected to an end of the central waveguide 21, while output waveguides 24 and 25 are connected to the other end of the central waveguide 21. The interaction length of the optical switch of FIG. 14 is longer than that of the optical switch of FIG. 6 (FIG. 13), thereby enabling a switching operation at low bipolar voltages.

Figure 15:
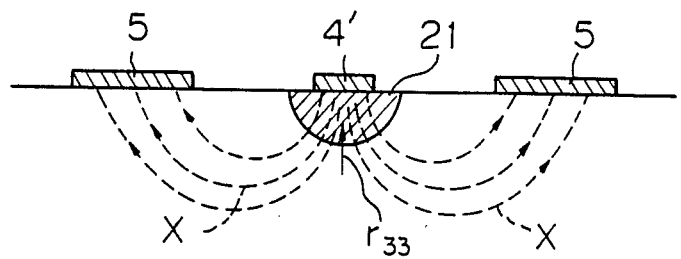
FIG. 15 is a cross-sectional view taken along the line XV—XV of FIG. 14.

As illustrated in FIG. 15, which is a cross-sectional view taken along the line XV—XV of FIG. 14, since the substrate 1 comprises a Z-cut $LiNbO_3$ crystal, an electric field indicated by the arrows X is applied to the $r_{33}$ direction of the Z-cut $LiNbO_3$ crystal when a positive voltage is applied to the electrode 4'.

Figure 16:
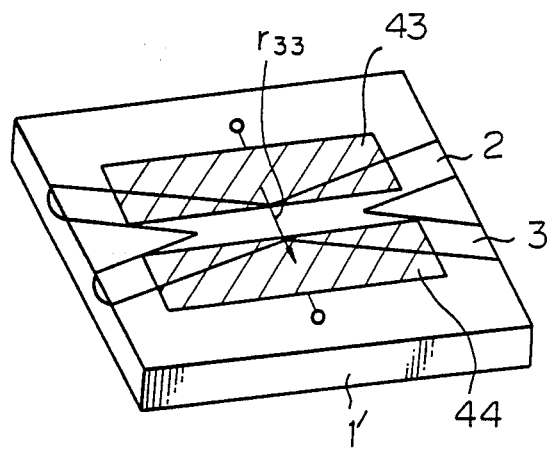
FIG. 16 illustrates a modification of the optical switch of FIG. 13.

In FIG. 16, which is a modification of the optical switch of FIG. 13, a Y-cut $LiNbO_3$ crystal substrate 1' is used instead of the Z-cut $LiNbO_3$ crystal substrate 1. In this case, two parallel electrodes 43 and 44 are provided so as to generate an electric field along the $r_{33}$ direction of the substrate. Note that the refractive-index-changed region is sandwiched by the electrodes 43 and 44.

Similarly, if an X-cut $LiNbO_3$ crystal substrate is used, two parallel electrodes are also provided so as to generate an electric field along the $r_{33}$ direction of the substrate.

Figure 17:
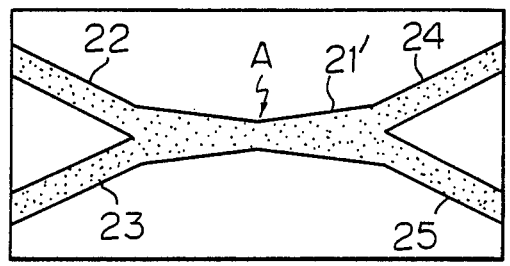
FIGS. 17 and 18 illustrate modifications of the waveguides of FIG. 14.
Figure 18:
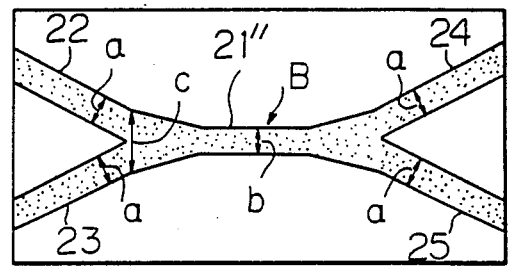

In FIG. 17, which illustrates a modification of the waveguides of FIG. 14, a central waveguide 21' is provided instead of the central waveguide 21 of FIG. 14. The width of the central waveguide increases with the distance from the center A of the central waveguide. Similarly, in FIG. 18, which is also a modification of the waveguides of FIG. 14, a central waveguide 21" is provided instead of the central waveguide 21 of FIG. 14. The width b of the central waveguide 21" at the center B is larger than the width a of the waveguides 22 through 25 and is smaller than the width c of the combination of the waveguides 22 and 23. Use of the waveguides illustrated in FIG. 17 or 18 enables improved crosstalk characteristics and lower operating voltages applied to the electrode 4', as compared with the waveguides of FIG. 14.

Figure 19:
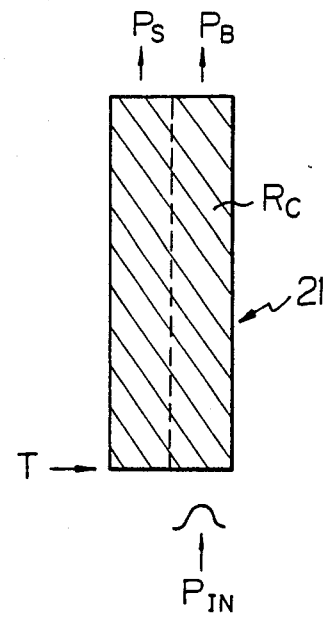
FIG. 19 illustrates the relationship between a center waveguide and a prior art refractive-index-changed region.

In FIG. 19, which illustrates the relationship between a central waveguide and a refractive-index-changed region according to prior art. The shaded refractive-index-changed region $R_C$ completely coincides with the central waveguide 21 having a width of 15 μm (See FIG. 14). In this case, when a voltage is applied to the electrode so as to generate a refractive index change Δn (=0.003) in the refractive-index-changed region $R_C$, light spreads over the entire central waveguide 21 0.4 mm apart from the terminal T thereof, as indicated by $D_1$ in FIG. 20. Then, light approaches the left (L) side of the central waveguide 21 0.8 mm apart from the terminal T, as indicated by $D_2$ in FIG. 20. Then, light again spreads over the entire central waveguide 21 1.2 mm apart from the terminal T, as indicated by $D_3$ in FIG. 20. Further, light approaches the right (R) side of the waveguide 21 1.6 mm apart from the terminal T, as indicated by $D_4$ in FIG. 20. By repeating the above-mentioned process, light propagates through the waveguide 21.

Figure 20:
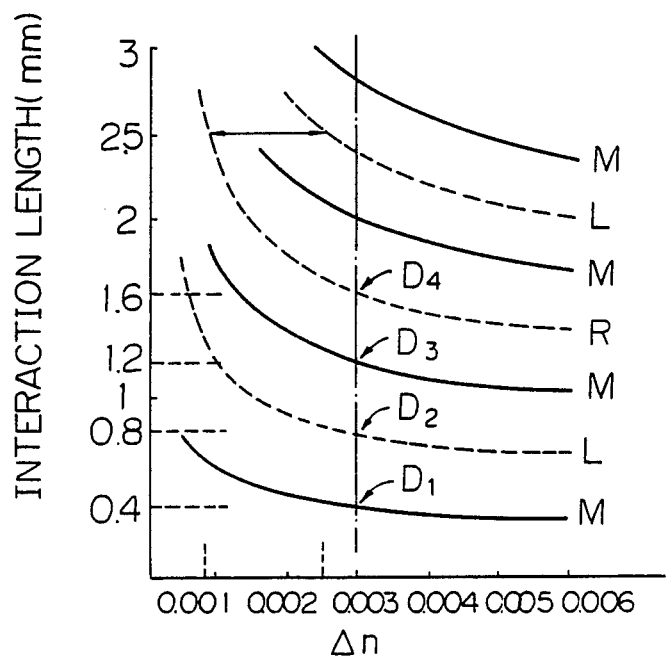
FIG. 20 illustrates the refractive index change $\Delta n$ of the refractive-index-changed region R and the interaction length of FIG. 19.

As is understood from FIG. 20, when the interaction length, i.e., the length of the central waveguide, is 2.5 mm, a switching operation is carried out by introducing a change (=0.0017) within the range of Δn from 0.0008 to 0.0025. That is, the refractive index change 0.0008 makes light propagate into the right side of the waveguide 21 (the branch mode), while the refractive index change 0.0025 makes light propagate into the left side of the waveguide 21 (the straight-through mode). Note that the longer the interaction length, the smaller the range of Δn.

Figure 21:
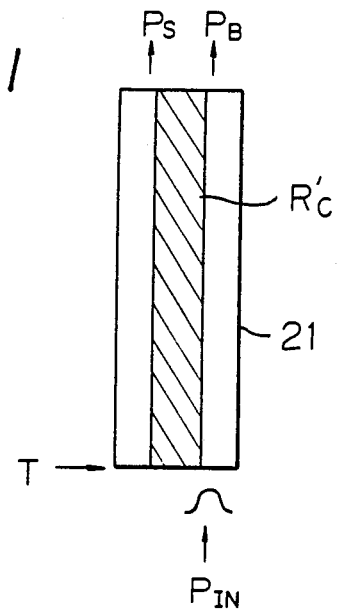
FIG. 21 illustrates the relationship between a center waveguide and a refractive-index-changed region according to the present invention.
Figure 22:
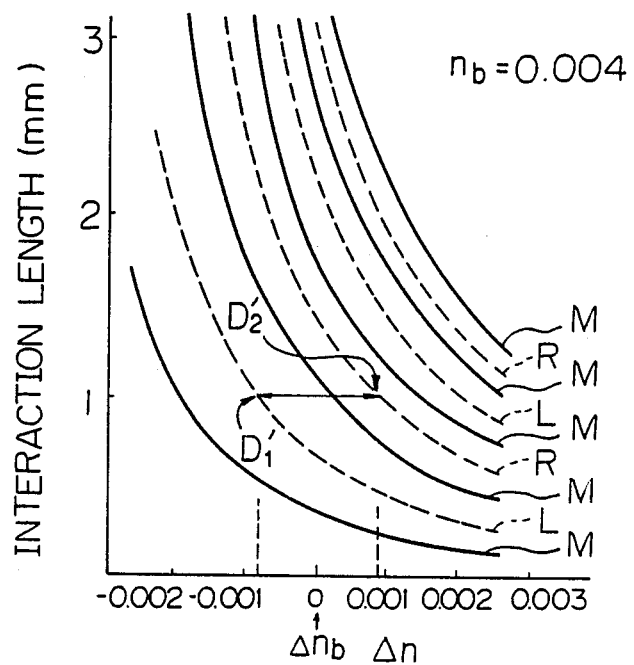
FIG. 22 illustrates the refractive index change $\Delta n$ of the refractive-index-changed region R and the interaction length of FIG. 21.

In FIG. 21, which illustrates the relationship between a central waveguide and a refractive-index-changed region according to the present invention, the shaded refractive-index-changed region $R_C'$ has a width less which is narrower than that of the center waveguide 21. In this case, the width of the refractive-index-changed region $R_C'$ is 6 μm, while the width of the central waveguide 21 is 15 μm. Also, the basic refractive index change $Δn_b$ is 0.004 where no voltage is applied to the electrode, as illustrated in FIG. 22. In the case of a waveguide length of 1 mm, when the refractive index change is −0.0008, light approaches the left (L) side of the central waveguide 21, as indicated by $D_1'$ in FIG. 22. On the other hand, when the refractive index change is 0.0009, light approaches the light (R) side of the center waveguide 21, as indicated by $D_2'$ in FIG. 22. Therefore, when the interaction length, i.e., the length of the central waveguide 21, is 1 mm, a switching operation is carried out by introducing a change (=0.0017) within the range of Δn from −0.0008 to 0.0009. Drive voltage is approximately in inverse proportion to interaction length, and lower drive voltage can be achieved with longer interaction length.

Thus, the smaller the width of the refractive-index-changed region, the smaller the length of the central waveguide 21. This is helpful in enhancing the integration of optical switches. Seen from a different angle, this means that, assuming that the length of the central waveguide 21 is the same, the refractive index change required for a switching operation is reduced, as compared with the prior art so as to enhance the operation speed.

As mentioned before, when the intersecting angle is 0.2° and the intersection length is 4 mm, the operating voltages are reduced to +12 V.

The foregoing disclosure relates to only an electro-optic switch by using electro-optically induced refractive index changing area, but the present invention can be applied to a thermal-optic switch by using thermal-optically induced refractive index changing area. Such a thermal-optic switch can be formed on a glass, $LiNbO_3$ crystal or sapphire substrate, on which an electrode having a appropriate resistivity such as thermal head is formed.

We claim:

1. A bipolar 2×2 type optical switch for single mode light comprising:
   an electro-optic crystal substrate;
   a central waveguide positioned in said substrate, having a center, two ends and a width that is greater at said ends than at said center;
   a pair of input waveguides positioned in said substrate, connected to said central waveguide at one of said two ends, and having an intersecting angle of less than 2°;
   a pair of output waveguides positioned in said substrate, connected to said central waveguide at the other of said two ends so as to be symmetrical with said pair of input waveguides about said central waveguide, and having an intersecting angle of less than 2°;
   a refractive-index-changed region positioned in said central waveguide and having a narrower width than said width of said central waveguide, and being formed symmetrically with respect to the center of said central waveguide; and
   a means for introducing a change in the refractive index of the refractive-index-changed region.

2. A switch as set forth in claim 1, wherein said refractive-index-changed region has a rectangular cross-section having a narrower width than the width of said central waveguide.

3. A switch as set forth in claim 1, wherein said refractive-index-changed region comprises two regions, each of which has a crosssection analogous to an isosceles triangle having a vertex located at the center of said central waveguide.

4. A switch as set forth in claim 1, wherein a portion of said central waveguide has a rectangular corsssection.

5. A switch as set forth in claim 1, wherein the width of said central waveguide increases from the center thereof.

6. A switch as set forth in claim 1, wherein a portion of said width of said central waveguide is constant in a region about the center.

7. A switch as set forth in claim 1, wherein said electro-optic crystal substrate comprises a LiNbO$_3$ Z plate; and
   wherein said refractive index change introducing means comprises:
   a drive electrode positioned on said index-changed region of said LiNbO$_3$ Z plate;
   a ground electrode positioned on said LiNbO$_3$ Z plate and displaced from said refractive-index-changed region; and
   a means for applying a positive voltage or a negative voltage to said drive electrode.

8. A switch as set forth in claim 1, wherein said electro-optic crystal substrate comprises a LiNbO$_3$ X or Y plate; and
   wherein said refractive index change introducing means comprises:
   two electrodes positioned on said LiNbO$_3$ X or Y plate and sandwiching said index-changed region; and
   a means for applying a positive voltage or a negative voltage to said electrodes.

9. A switch as set forth in claim 1, wherein said input and output waveguides are single-mode waveguides.

10. A bipolar-type 2×2 type optical switch for single-mode light comprising:
    an electro-optic crystal substrate comprising a LiNbO$_3$ Z plate;
    two waveguides intersecting at an angle of less than 2° positioned in said substrate, said waveguides having a higher refractive index than said substrate and an intersecting portion of said two waveguides having a width being smaller at a center portion than at end portions thereof;
    a refractive-index-changed region in said intersecting portion having a narrower width than said width of said intersecting portion, and being positioned symmetrically with respect to said center of said intersecting portion; and
    refractive index change means for introducing a change in the refractive index of said refractive-index-changed region;
    said refractive index change means comprising:
    a drive electrode formed on said refractive-index-changed region of said LiNbO$_3$ Z plate;
    a ground electrode positioned on said LiNbO$_3$ Z plate and displaced from said refractive-index-changed region; and
    a means for applying a positive voltage or a negative voltage to said drive electrode.

11. A switch as set forth in claim 10, wherein said refractive-index-changed region has a rectangular cross-section having a narrower width than the width of said intersecting portion of said waveguides.

12. A switch as set forth in claim 10, wherein said refractive-index-changed region comprises two regions, each of which has an isosceles triangle shaped cross-section having a vertex located at said intersecting portion of said waveguides.

13. A switch as set forth in claim 10, wherein said input and output waveguides are single-mode waveguides.

14. A switch as set forth in claim 1 or 10, wherein said waveguides are Ti diffused waveguides.

15. A bipolar 2×2 type optical switch for single-mode light comprising:
    an electro-optic crystal substrate comprising a LiNbO$_3$ X or Y plate;
    two waveguides intersecting at an angle of less than 2° and positioned in said substrate, said two waveguides having a higher refractive index than said substrate and an intersecting portion of said two waveguides having a width being smaller at a center portion than at end portions of the intersecting portion;
    a refractive-index-changed region in said intersecting portion having a narrower width than said width of said intersecting portion, and being positioned symmetrically with respect to said center of said intersecting portion;
    refractive change means for introducing a change in the refractive index of said refractive-index-changed region, said refractive change means including:
    two electrodes positioned on said LiNbO$_3$ X or Y plate and
    sandwiching said index-changed-region, and
    means for applying a voltage to said electrodes.

* * * * *

UNITED STATES PATENT AND TRADEMARK OFFICE
CERTIFICATE OF CORRECTION

PATENT NO. : 4,730,884

DATED : March 15, 1988

INVENTOR(S) : Minoru Seino et al.

It is certified that error appears in the above-identified patent and that said Letters Patent is hereby corrected as shown below:

```
Col. 6, line 28, delete "less".

line 59, "+" should be -- ± --.

Col. 7, line 32, "crosssection" should be
        -- cross-section --.
```

Signed and Sealed this

Fourth Day of October, 1988

*Attest:*

DONALD J. QUIGG

*Attesting Officer*   *Commissioner of Patents and Trademarks*